United States Patent [11] 3,607,439

[72] Inventor Eugene A. Lilley
 Alton, Ill.
[21] Appl. No. 848,376
[22] Filed July 2, 1969
[45] Patented Sept. 21, 1971
[73] Assignee Olin Mathieson Chemical Corporation

[54] MINATURE BATTERY OR POWER CELL CONTAINERS
 6 Claims, No Drawings

[52] U.S. Cl. .................................................. 136/166,
 29/196.3, 29/472.3, 136/176
[51] Int. Cl. .................................................. H01m 1/00
[50] Field of Search .......................................... 136/166,
 167, 175, 176, 127–129; 29/196.3, 196.1, 196.2,
 196, 191, 199, 472.3, 470.1, 471.1, 471.7; 206/2

[56] References Cited
 UNITED STATES PATENTS
2,691,816 10/1954 Siegel ............................ 29/189
2,713,196 7/1955 Brown ........................... 29/196
3,175,893 3/1965 Meretsky ....................... 29/197
3,381,365 5/1968 Winter .......................... 29/472.3

Primary Examiner—Winston A. Douglas
Assistant Examiner—A. Skapars
Attorneys—Robert H. Bachman, Richard S. Strickler, Donald R. Motsko and Thomas P. O'Day ABSTRACT: A battery or power cell container comprising an iron base alloy component, a copper base alloy component containing an alloying substituent selected from the group consisting of 0.5 to 5.0 percent iron, 0.5 to 2.0 percent cobalt and mixtures thereof, balance essentially copper, bonded to a side of said iron base alloy component and an additional alloy component selected from the group consisting of the brasses, cupro-nickels, and nickel-silvers bonded to the opposite side of said iron base alloy component, and the method of producing said container.

MINATURE BATTERY OR POWER CELL CONTAINERS

The present invention relates to composite metal articles. More particularly, the present invention resides in a composite metal power cell or battery container having an iron and/or cobalt containing copper base alloy, and an iron base alloy and a corrosion-resistant copper base alloy integrally bonded together.

Composite articles having an iron core and a copper cladding are highly desirable commercially due to the fact that the beneficial characteristics of the core and cladding materials may be contained in one composite article. In a single alloy frequently many properties cannot be greatly modified by alloying or thermal treatments, for example, such properties as modules of elasticity, color, density, and strength in combination with high thermal or electrical conductivity. However, by forming composites apparent properties of the cladding can be generated while retaining the bulk properties of the core material. In this manner one can often obtain greatly modified and highly desirable properties over the single alloy.

For example, iron has the advantage of high strength at both room and elevated temperature and cold formability. By forming iron composites one can retain these desirable properties while generating properties of the cladding, such as wear resistance, color oxidation, conductivity, or corrosion resistance.

The present invention, in particular, relates to batteries and power cells and battery and power cell containers. Miniature battery and power cells are preferably used for transistor radios, photographic meters, photoelectric eyes, hearing aid cells, watches, clocks, business machines, industrial instruments, various communication devices, etc. At present the package for containment of such power cells is made of nickel-plated steel cups used as bases and nickel-plated steel saucer-shaped discs used as tops. Both of these components are fabricated from nickel-plated steel strip.

The nickel plate is employed as a barrier to prevent the electrolyte from contacting the steel base during service. Should the electrolyte contact the steel hydrogen gas would thereby be formed which would cause an explosion and rupture of the cell. This is so since iron would become anodic, for example, in an alkaline cell having an anode such as zinc, a cathode such as mercuric oxide, and an electrolyte such as potassium hydroxide, i.e., an electrolytic reaction would occur wherein hydrogen gas is evolved at the iron surface. However, nickel-plated steel strip has the disadvantage of causing problems in fabrication in that nickel plate is brittle and thus has a tendency to crack during fabrication of the power cell container components from the nickel-plated steel strip. Furthermore, the nickel plate is also susceptible to penetration from scratching, etc. due to the relative thinness of the deposit. It is therefore desirous to provide a method whereby a more effective barrier is provided against penetration of an alkaline electrolyte to the steel base during service.

It is therefore a principal object of the present invention to provide a new and improved battery and power cell and a battery and power cell container.

It is a further object of the present invention to provide a method for producing a new and improved battery or power cell and container therefore.

It is still a further object of the present invention to provide an article as aforesaid whereby the article is characterized by having high strength, excellent physical properties and excellent corrosion resistance.

Still further objects and advantages of the present invention will appear hereinafter.

In accordance with the present invention, it has now been found that the foregoing objects and advantages may be readily obtained.

The present invention readily overcomes the disadvantages of the art and is a simple, convenient, and highly useful article. The present invention is a power cell or battery container, said container comprising: (A) an iron base alloy component; (B) a copper base alloy component containing an alloying substituent selected from the group consisting of 0.5 to 5.0% iron, 0.5 to 2.0% cobalt, and mixtures thereof, balance essentially copper integrally bonded to a side of the iron base alloy of A; (C) an additional alloy component selected from the group consisting of the brasses, copper nickels and nickel silvers integrally bonded to the opposite side of the iron base alloy of (A).

Preferably but not necessarily the aforementioned bonding should be in accordance with the methods of U.S. Pat. Nos. 3,381,364 and 3,381,365 which teach convenient methods for producing composite metal articles. For example, U.S. Pat. No. 3,381,365 teaches a method for preparing an iron base alloy core composite. It is difficult to produce a composite article having an iron base core or cladding due to the formation of both adherent and flaky oxides at moderate or elevated temperatures necessary for hot rolling. This oxide layer frequently tends to break open during hot rolling but still can and often does cause severe problems. Briefly, the process described in the aforementioned U.S. Pat. No. 3,381,365 provides for heating the core, of a thickness less than 0.50 inch, to a temperature between 300 and 1,350° F., rolling together said core and cladding at a speed of at least 100 ft. per minute in one pass at a reduction range between 35% to 75% with said core cladding coming together for the first time in the bite of the rolls, said cladding of a thickness less than 0.125 inch and contacting the roll prior to contacting of the core. It is necessary that the included angle between the core and the cladding is in excess of 5° upon entering the rolls, with the preferred angle in excess of 10°. An angle in excess of 10° will insure that the cladding and the core do not come together earlier than in the bite of the rolls.

Upon entering the rolls, the cladding and the rolls are traveling at different linear speeds whereas upon exiting from the rolls they are going at the same speed due to reduction in thickness of the composite. The difference in traveling speeds between the rolls and the cladding in combination with the precontacting of the cladding and the rolls generates a shear strain and introduces shearing at the bite of the rolls and the corecladding interface. The shearing strain at this interface results in turbulent material flow thereby causing more intimate bonding by increasing interfacial linear surface of the composite by at least 20%. It is further noted that the interfacial surface between the core and cladding is characterized by the absence of interatomic diffusion between the core and cladding material.

Naturally, other methods of bonding cladding to an iron or copper base alloy core may also be employed. By the use of a copper base alloy containing 0.5% to 5.0% iron and/or 0.5 to 2.0% cobalt the aforementioned tendency to rupture during subsequent mechanical operations is significantly decreased. By allowing iron and/or cobalt in small amounts grain growth in the copper base alloy is substantially restricted during annealing at the temperature range required to soften the iron base alloy component after having formed the composite article. By restricting grain growth the yield strength of the copper base alloy component is increased to within at least 40% of the iron base component. Thus, less thinning of the copper base alloy component occurs during subsequent mechanical forming operations wherein a change occurs in the contour of the article. In addition, the copper base alloy component does not tend to pull away or loosen from the iron base core component, or incipiently fracture, during such operations.

In accordance with the present invention any iron base alloy may be employed as the core material, i.e., any alloy containing a major proportion of iron. Typical iron base alloys which may be employed include but are not limited to the following: high purity iron, alloys of the iron-carbon family, iron-chromium family, iron-manganese family, iron-nickel family, and the iron-nickel-chromium family, etc. Typical alloying constituents include but are not limited to the following: carbon, aluminum, titanium, silicon, phosphorus, sulfur, chromium, nickel, zirconium, and zinc.

The copper alloy in contact with the acid electrolyte is a copper base alloy containing from 0.5 to 5.0% iron and/or 0.5 to 2.0% cobalt.

Naturally, small amounts of elements may also be present in the copper base alloy as impurities, i.e., 0.2 maximum zinc, 0.03 maximum lead and total all other impurities 0.10% nominal, so long as not employed as an alloying constituent.

The alloy to be employed on the other side of the iron base alloy may be any suitable alloy having good corrosion resistance such as an alloy from the group of the brasses, nickel silvers, i.e., copper base alloys containing both nickel and zinc as alloying substituents, and cupro-nickels. Naturally copper or the aforementioned iron and/or cobalt containing copper base alloy may also be readily employed, if desired. This particular cladding component is, unlike the aforementioned copper base alloy component, not exposed to the acid electrolyte solution and hence may be of any alloy determined to be most desirable for the aforementioned purposes depending upon the actual service of the power cell contemplated, as well as for esthetic purposes.

Preferably, but not necessarily, the thickness of the integral composite ranges from about 0.005 to 0.021 when employed as the means for containing the battery or power cell, with the cladding components each ranging from about 5 to 15% of the total thickness and the balance the iron base core.

Thus, it is seen that the present invention provides for a composite article having excellent mechanical properties, excellent corrosion resistance and pleasing in appearance.

The present invention also provides for an integral battery and power cell container comprising an iron and/or cobalt bearing copper base alloy component, an iron base alloy component and a suitable corrosion resistant second alloy component. Less thinning of the copper base alloy component occurs during the mechanical forming operation of the components thereby the use of a thinner copper base alloy component is permitted. In addition, the tendency of the iron and/or cobalt bearing copper base alloy component to pull away or loosen during forming is substantially lessened thereby insuring a finished article having excellent mechanical properties.

In addition, the problem of cracking and thereby exposing the iron base to the acid electrolyte by the currently employed method of nickel-plating is eliminated. The present invention will be more readily apparent from a consideration of the following illustrative example:

EXAMPLE

A copper base alloy containing from 2.1 to 2.6% iron was integrally bonded on one side of S.A.E. 1,010 carbon steel and a nickel silver alloy was bonded on the other side. The resultant composite comprised a steel core approximately 0.0068 in. thick with the copper base alloy cladding on the one side approximately 0.008 in. thick. The composite was then annealed at a temperature of about 1,100° F. to effect recrystallization in the steel core, the nickel silver cladding and the iron containing copper base alloy cladding. The resultant grain size in iron containing copper base alloy cladding was approximately 0.006 mm. No incipient fracturing and very little thinning of the iron-containing copper base alloy cladding was detected after subsequent forming into a power cell container.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A power cell or battery container, said container comprising,
   A. an iron base alloy component,
   B. a copper base alloy component containing an alloying substituent selected from the group consisting of 0.5 to 5.0 percent iron, 0.5 to 2.0 percent cobalt, and mixtures thereof, balance essentially copper integrally bonded to a side of said iron base alloy,
   C. an additional alloy component selected from the group consisting of the brasses, copper nickels, and nickel silvers integrally bonded to the opposite side of said iron base alloy said container being adapted to contain spaced-apart anode and cathode and an electrolyte.

2. A power or battery cell container according to claim 1 wherein said additional alloy is nickel-silver.

3. A method of producing an improved battery or fuel cell container, comprising:
   A. providing an iron base alloy component,
   B. integrally bonding a copper base alloy to a side of said iron base alloy component, said copper base alloy containing an alloying substituent selected from the group consisting of 0.5 to 5.0% iron, 0.5 to 2.0% cobalt, and mixtures thereof, balance essentially copper,
   C. integrally bonding an additional alloy component selected from the group consisting of the brasses, copper nickels and nickel-silvers to the opposite side of said iron base alloy component, and
   D. forming into a battery or power cell container.

4. The method of claim 3 wherein said additional alloy component is nickel-silver.

5. A method of producing an improved acid electrolyte resistant battery or power cell, comprising:
   A. providing an iron base alloy component,
   B. integrally bonding a copper base alloy to a side of said iron base alloy component, said copper base alloy containing an alloying substituent selected from the group consisting of 0.5 to 5.0% iron, 0.5 to 2.0% cobalt, and mixtures thereof, balance essentially copper,
   C. integrally bonding an additional alloy component selected from the group consisting of the brasses, copper nickels and nickel-silvers to the opposite side of said iron base alloy component,
   D. Forming into a battery or power cell container, and
   E. operatively inserting a battery or power cell into said container.

6. A battery or power cell, comprising,
   A. a container comprising an iron base alloy, a nickel-silver alloy integrally bonded to a side of said iron base alloy, and a copper base alloy bonded to the opposite side of said iron base alloy wherein said copper base alloy contains an alloying substituent selected from the group consisting of 0.5 to 5.0% iron, 0.5 to 2.0% cobalt, and mixtures thereof, balance essentially copper.
   B. an anode disposed within said container,
   C. a cathode within said container and separated from said anode,
   D. an electrolyte within said container and contacting said anode and cathode whereby an electrical circuit is formed between said anode and cathode.